(12) United States Patent
Damnjanovic et al.

(10) Patent No.: US 6,833,184 B2
(45) Date of Patent: Dec. 21, 2004

(54) PIGMENTED WINDOW FILM

(75) Inventors: Ratka Damnjanovic, Oldsmar, FL (US); Haibin Huang, Tampa, FL (US)

(73) Assignee: Film Technologies International, Inc., St. Petersburg, FL (US)

(*) Notice: Subject to any disclaimer, the term of this patent is extended or adjusted under 35 U.S.C. 154(b) by 380 days.

(21) Appl. No.: 09/903,066

(22) Filed: Jul. 11, 2001

(65) Prior Publication Data

US 2003/0064215 A1 Apr. 3, 2003

(51) Int. Cl.⁷ .............. B32B 5/16; B32B 15/02; B32B 27/00
(52) U.S. Cl. ............ 428/323; 428/403; 428/407; 428/500
(58) Field of Search .................. 428/323, 327, 428/343, 344, 354, 355 R, 403–407, 411.1, 457, 480, 500

(56) References Cited

U.S. PATENT DOCUMENTS

| | | |
|---|---|---|
| 3,711,176 A | 1/1973 | Alfrey, Jr. et al. |
| 4,634,637 A | 1/1987 | Oliver et al. |
| 4,797,317 A | 1/1989 | Oliver et al. |
| 4,973,511 A | 11/1990 | Farmer et al. |
| 5,217,791 A | 6/1993 | Fujita et al. |
| 5,683,805 A | 11/1997 | Oita et al. |
| 5,830,568 A | 11/1998 | Kondo |
| 5,830,578 A | 11/1998 | Ono et al. |
| 5,863,599 A | 1/1999 | Lew |
| 5,908,704 A | 6/1999 | Friedman et al. |
| 5,972,453 A | 10/1999 | Akiwa et al. |
| 6,027,816 A | 2/2000 | Ono et al. |
| 6,159,608 A | 12/2000 | Friedman et al. |

FOREIGN PATENT DOCUMENTS

| | | | |
|---|---|---|---|
| EP | 0770654 A3 | 8/1998 | ............ C09J/7/02 |
| EP | 0928823 A1 | 5/1999 | ............ C09J/7/02 |

*Primary Examiner*—Sheeba Ahmed
(74) *Attorney, Agent, or Firm*—Larson & Larson, PA; Herbert W. Larson

(57) ABSTRACT

This invention relates to window films and more particularly to a low haze colored window film wherein coloration of the window film is effected with a pigment. The invention further is concerned with a process for the manufacture of the pigmented window film. The window film of this invention is pigmented with a pigment having small particle size wherein the particles are coated with a resin binder which encapsulates the pigment particles. The encapsulated pigment particles are blended into an adhesive which is compatible with the resin binder which is used to encapsulate the pigment particles. The resulting adhesive is used to secure one or more film layers of a composite window film structure together. The resulting films have haze levels which approximate the haze levels of dyed window films. The window films of this invention have outstanding light stability.

10 Claims, 4 Drawing Sheets

(3 of 4 Drawing Sheet(s) Filed in Color)

PIGMENTED WINDOW FILM

FIELD OF THE INVENTION

This invention is concerned with film technology and more particularly with window films, which are colored or shaded with a pigment. In accordance with this invention, the optical properties of a window film are altered by use of a pigment in lieu of a dye. By use of the process, structure and composition of this invention window films having low haze levels are produced. In addition to low haze levels this invention is concerned with a window film which has superior light stability and hence a film that has an extended life.

BACKGROUND OF THE INVENTION

The application or retrofitting of films to windows and other substrates for various purposes is quite common. The films of this invention are applied to windows, for example, polymeric or glass panes. The most common application of the films of this invention is to automotive windows. Films can also be applied to window panes to affect the ability of these panes to absorb or transmit heat or ultraviolet (UV) light. Further, films can be applied in order to change the color of a window pane, it is these colored films with which this invention is concerned. Likewise, films can be applied in order to increase the strength of a window pane and in particular, the ability of the window pane to stay intact after an impact with a foreign object. Films are also applied to window panes in order to alter the ability of the window pane to transmit, absorb or reflect visible and invisible solar radiation. In all applications of films, it is desirable that the haze level of the film be minimal. This invention is concerned with colored window films which have minimal haze and which are extremely light stable. Further this invention is concerned with window films wherein the coloration of the films is effected with a pigment. In the prior art most window films were colored with dyes, which fade when exposed to sunlight. More particularly this invention is concerned with colored window films which in addition to being very light stable have a low haze level. In the prior art pigmented window films have unacceptable haze levels. This haze results from the fact that light is scattered off of pigment particles at an unacceptable rate.

DESCRIPTION OF THE DRAWINGS

The file of this patent contains at least one drawing executed in color. Copies of This patent with color drawings(s) will be provided by the Patent and Trademark Office upon request and payment of the necessary fee.

BRIEF DESCRIPTION OF THE INVENTION

Figure 1:
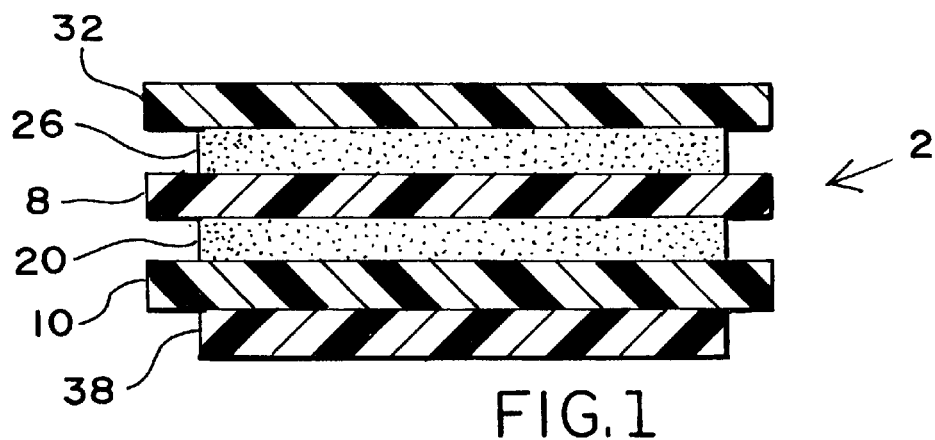
FIG. 1 is a cross section view of the basic window film of this invention.

Window films are widely retrofitted for a variety of purposes. The use of window films for the purpose as described above is well known in the prior art. Regardless of the widespread retrofitting of window films, the problem of haze in the window film system is common and troublesome. The troublesome haze results from the undesirable scattering of visible light by one or more components of the window film system. Some window films may be clear however most window films are colored. For example in automotive applications window films are tinted or colored in order to affect the amount of sunlight that is allowed to enter the inside of a vehicle. Window films may be colored by the use of metal films, dyes and pigments. As used relative to this invention the term colored film refers to a film wherein the optical properties of the film as viewed from either side are altered. In the case of a metal film as viewed from one side this film presents a shiny metallic surface. In contrast when viewed from the opposite side usually the inside of the building or vehicle these films present a darkened blue or grayish color.

Dyes are commonly used in the prior art to effect the coloration of window films. This coloration is effected by the dying of one or more film components, of a composite system, or by the dying of an adhesive, which is used to bond the composite systems together. Dyes do an excellent job of coloring window films, and they are easy to use. Regardless of these properties dyed window film have a serious deficiency in that they tend to fade when exposed to sunlight. This degradation results from the alternation of the organic dye molecule by sunlight i.e. they change color or they fade. As a result of this degradation dyed window films have a short life, particularly in automotive applications.

In order to produce an inexpensive and yet durable light stable film, this invention is concerned with a window film wherein coloration is effected using a pigment. Pigmented window films tend to have unacceptable haze levels.

The subject invention is concerned with a means whereby the haze levels of pigmented films can be reduced to acceptable levels.

BRIEF DESCRIPTION OF THE PRIOR ART

As is mentioned above the three most common methods for the production of colored window films are as follows.

1. Incorporate a metallic layer into one of the components of the window film.
2. Dye one of the components of the window film.
3. Color one of the components of the window film with a pigment.

The first procedure as listed above produces satisfactory window films, which are more stable than dyed films, however they are expensive to produce. Further window films, which incorporate metallic layers, are troublesome in that the metallic layers can corrode and oxidize.

The second procedure wherein a dye is used to produce a colored window film, is commonly utilized and produces a satisfactory window film. The big problem with these films is that the organic dyes tend to degrade after exposure to sunlight and hence the films have a relatively short life expectancy.

The third procedure as listed above produces acceptable film, which are more stable than the dyed films, however the prior art pigmented films have unacceptable haze levels. These unacceptable haze levels are in excess of 3 percent. The procedure wherein these haze levels are measured will be described in detail herein below.

U.S. Pat. No. 5,683,805 discloses a window film wherein coloration is effected by the use of a pigmented layer to impart color to the film. The dispersion process involved in a sand-grinding mill, a ball mill or an attritor. However, there is no mention of pigment particle size or distribution, which will contribute to the haze level. Further, the percentage of pigment load used was about 1.5%, which is much lower than the pigment concentrations used in the invention of this application.

U.S. Pat. No. 4,797,317 at col. 3 line 20 mentions the fact that pigments can be used to color solar control window films. While there is no mention of the haze level of the resulting film it is felt that the haze level would be in excess of 4 percent.

U.S. Pat. No. 5,830,568 discloses a laminated glass structure wherein two sheets of glass are laminated together to produce safety glass for automotive use. The function of the intermediate polymeric sheet is to prevent the glass components from shattering during impact. The intermediate sheet may be colored with a pigment. The use of fine pigments to effect coloration is discussed, these pigments are incorporated into the intermediate sheet layer. The film layer is relatively thick i.e. 0.2 to 1.2 mm.

U.S. Pat. Nos. 5,830,578 and 6,027,816 disclose coatings for polymeric lens wherein the coatings incorporate ultra fine pigments.

DESCRIPTION OF THE PREFERRED EMBODIMENT

In accordance with the above discussion, this invention is concerned with a process for controlling window film haze in pigmented window films. Window films have been retrofitted for over thirty years and have become very popular in the last decade. These films are generally polymeric films, which are bonded to the window pane with an adhesive. Colored window films are most commonly produced by the dyeing of one or more components of the window film. The degradation of these dyes causes optical problems with these dyed window films. These optical problems result from the fact, that as the dyes degrade, the dyed components take on a bleached appearance, which is unsightly. Because of this unsightly appearance the degraded window film must be totally removed and replaced. This removal is effected with great difficulty.

Automotive usage represents the biggest usage for retrofitted window films. In recent years automobiles have become more durable and hence have a longer useful life. This longer useful life accentuates the problem of the degraded window films as the retrofitted window films fail before the automobile had reached the end of its useful life.

In accordance with the prior discussion it can be seen that the principle problem with the prior art colored window film is the fact that they failed primarily, due to the fading of dyed components.

Pigments are more light stable than dyes and hence pigmented window films are substantially more light stable, than dyed window films. In fact pigmented window film as produced in accordance with this invention have a life span which is substantially longer than of the prior art dyed window films i.e. more than seven times of that of the prior art dyed window films.

Regardless of their light stability pigmented window films are troublesome in that they have inherently more haze than dyed window films. Haze in pigmented window films results from the scattering of light off of pigment particles.

There is no standard haze requirement for window films in the United States. However, a haze value of less than 3% is the specified for laminated glass (U.S. Pat. No. 5,830, 568). Commonly used prior art metallized films, with visible light transmission of 55–65%, have haze values between 0.99 to 1.31%. Prior art dyed window films, as are presently being sold, have haze levels of about 3% and are deemed to be acceptable.

As is discussed above relative to the prior art, it is generally known in the prior art that when coloration is effected in an optical component haze can be minimized by the use of ultra fine pigments. That is the finer the particle size the less likely the pigment is to create haze in an optical environment.

While the use of small particle size pigments, to impart color to optical devices is generally recognized in the prior art, the use of these fine pigments on a continuous production basis presents problems. Window films are created on coating machines in batches, which can exceed 10,000 ft. rolls. While the use of small particle size pigments is desirable in order to reduce haze levels the processing of these pigments presents severe problems due to the physical properties of these pigments.

The surface area of a given quantity of a pigment is dependent on the particle size of the pigment. That is the smaller the particle size of a given quantity of pigment the greater the surface area. Likewise, for a given quantity of pigment, the greater the surface area the greater the surface energy. Further the greater the surface energy of a given quantity of pigment the greater is the tendency of said pigment to agglomerate. Agglomeration is the process whereby individual pigment particles tend to combine together to form masses of pigment particles. This tendency of small particle size pigments to agglomerate is very troublesome in the manufacture of window films as this agglomeration tends to produce streaked or blotched window films. Naturally this streaking or blotching is totally unacceptable in the window film art where optical perfection is the norm.

Pigments are essentially insoluble in the components which make up a window film and in particular in the adhesives which are used to secure the various components of a window film together.

The placement of the pigment in an adhesive layer is the most practical way to color a film by pigmentation. In the manufacture of a composite window film a continuous sheet of a film component is run through a tank of adhesive to coat one or more surfaces of the film with the adhesive. Because of the insolubility of the pigment in the adhesive, in a large tank of adhesive which incorporates a suspended pigment, the pigment will fall out of suspension. With this fall out individual pigment particles will agglomerate.

In order to prevent this agglomeration in accordance with this invention the pigment particles are coated with a resin binder. In this regard it should be noted that a resin binder is a solid polymeric medium, which is used to coat each individual pigment particle.

A resin binder is a polymer coating which functions as a primer to combine pigments and adhesive together. Encapsulation is an example.

In order to facilitate the dispersion of the pigment particles in the adhesive the resin binder, which coats the pigment particles, should be compatible with the adhesive. Two factors, which enter into this compatibility, are polarity and solubility. Generally it is desirable that the resin binder be soluble in the adhesive and that the polarity of the resin binder match the polarity of the adhesive. Further it is desirable that the resin binder incorporate functional groups which are the same or similar to the functional groups on the adhesive.

Resin binders for use in this invention, to coat the pigment particles, may be water or solvent based. It is preferred in accordance with this invention that the pigment be placed in the adhesive component of the composite window film. Also, the pigments can be incorporated into the films or both in adhesive and the film.

Examples of suitable solvent based resin binders for use in this invention are vinyl chloride, vinyl acetate, polyvinyl butyral, or their copolymers with Weight Average Molecular Weight (Mw) between 10,000 and 100,000. These resin binders will be described in greater detail herein below.

Suitable adhesives for use in accordance with this invention may be polyester, acrylic, polyvinyl, ethyl vinyl acetate, or polyamide resins, urethane resins and copolymers thereof.

The pigment is a critical component of the window film structure of this invention. The pigment may be inorganic or organic, however for use in this invention organic pigments are preferred.

Pigments are not soluble in solvents and/or resins. For use in this invention the extremely fine solid particles of pigments must to be incorporated into a resin binder in order, to produce a colloidal suspension in the adhesive matrix. A colloidal suspension is characterized by its behavior in that the finely divided small particles do not settle under the force of gravity. The best dispersion results are obtained when the geometry of the dispersion container, the diameter, the peripheral velocity and the height of the dissolver disc above the bottom of the vessel as well as the Theological premix properties are matched to one another.

Suitable inorganic pigments for use in this invention are carbon black, titanium-dioxide, mica, ultramarine blue, and zinc oxide.

Examples of organic pigments are phthalocyanines, azos, disazos, monoazos, anthraquinones etc.

Preferred pigments for use in this invention are solid organic pigments sold under the trademark, Microlith, Renol, Permajet, Hostaperm, Sicotrans, Paliogen, Paliotol, etc. by Ciba Speciality Chemicals Corporation, 4050 Premier Drive, High Point, N.C. 27265; Clariant Corporation, 500 Washington Street, Coventry, R.I. 02816; BASF Corporation, 4330 Chesapeake Dr., Charlotte, N.C. 28216, and others.

Pigments for use in this invention are encapsulated with organic resin binders. Preferred pigments for use in this invention are predispersed in a keton and ester soluble vinyl chloride/vinyl acetate copolymer resin binder. The most preferred resin binders are polyvinyl chloride/vinyl acetone copolymers and polyvinyl butyral polymers.

In the case of the polyvinyl chloride/vinyl acetone copolymers the ratio of polyvinyl chloride to vinyl acetate can be from about 10/90 to 95/5, a more preferred range is from about 70/30 to about 90/10 with a most preferred ratio being 85/15. The molecular weight (Mw) of these copolymers can be from about 10,000 to about 100,000. A more preferred range is from about 30,000 to about 80,000 with a most preferred range being 55,000–65,000. These polyvinyl chloride vinyl acetate copolymers have a polydispersity index of 2–3.

As to the preferred polyvinyl butyral polymers these copolymers may have a molecular weight (Mw) of from about 10,000 to about 100,000, with a more preferred range being from about 30,000 to about 80,000, with a most preferred range being from about 55,000 to about 65,000. These polyvinyl butyral polymers have a polydispersity index of 2–3.

For use in this invention ultra fine pigments are preferred. It is preferred that the pigment size be from about 0.003 to about 0.2 microns, with a more preferred range being from about 0.003 to about 0.06 microns, with a most preferred pigment size being less than 0.06 microns. These pigment sizes refer to the average size of the uncoated pigment particles. The particle size of the pigment can be measured with Coulter N4 Plus counter, as manufactured by the Beckman Coulter Corp., or by use of an electric scanning microscope or the ultracentrifuge method.

In the preferred embodiment of this invention the pigment, which is coated with a resin binder, is incorporated into an adhesive layer which is used to bond one or more film layers together. The amount of pigment blended into the film structure (the adhesive layer) is such that the VLT of the resulting film is from about 5 to 75 percent, with a more preferred range being from about 5 to about 55 percent. The VLT of a film is the ratio of the amount of visible light, which is transmitted through a film, to the amount of visible light to which the film is exposed. It is understood by one skilled in the art that the amount of pigment utilized depends on the physical and optical properties of the pigment used and the depth of color desired.

Figure 2:
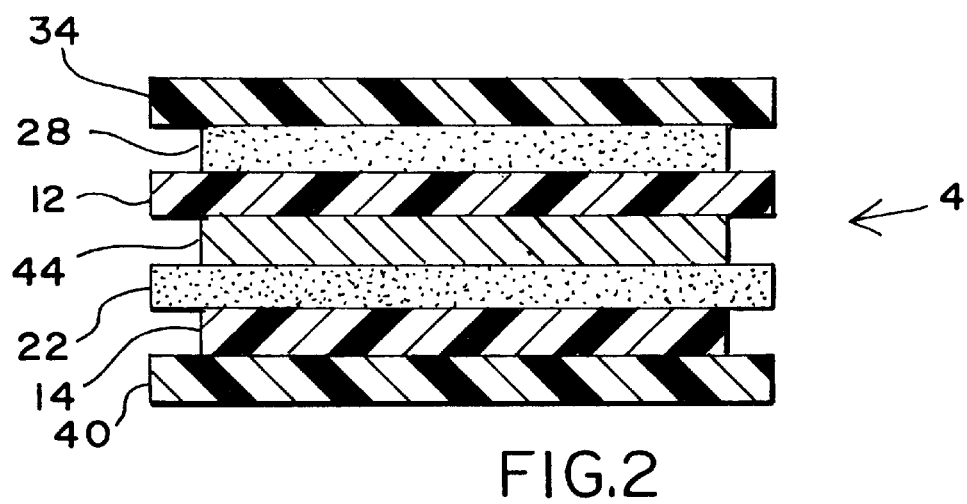
FIG. 2 is a cross section view of a metallized window film in accordance with this invention.
Figure 3:
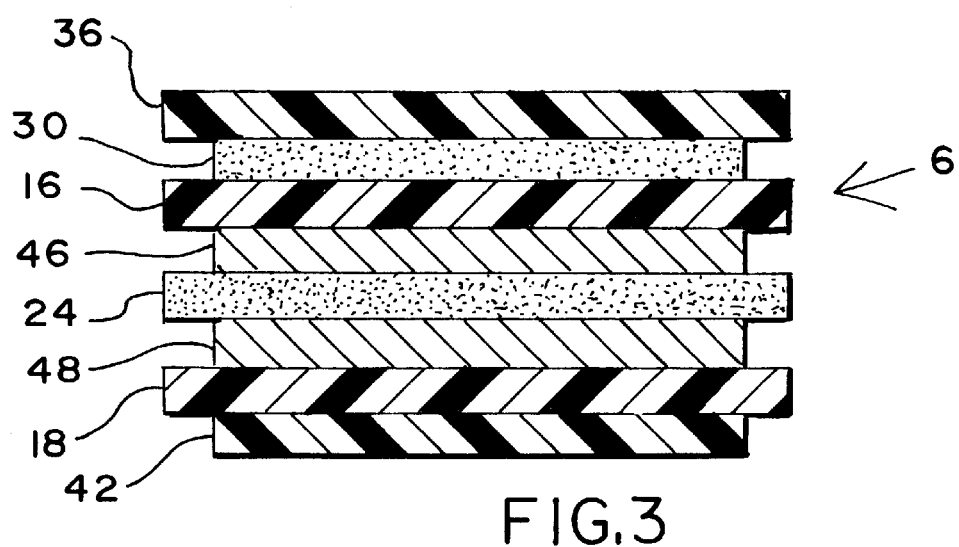
FIG. 3 is a cross section view of a preferred metallized window film of this invention.
Figure 4:
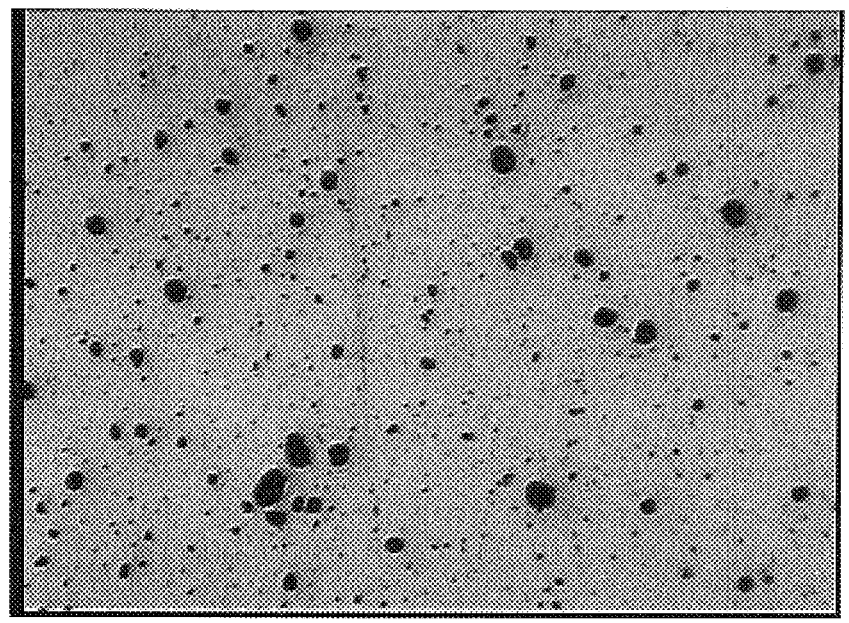
FIG. 4 is a photomicrograph showing the pigment before dispersion.
Figure 5:
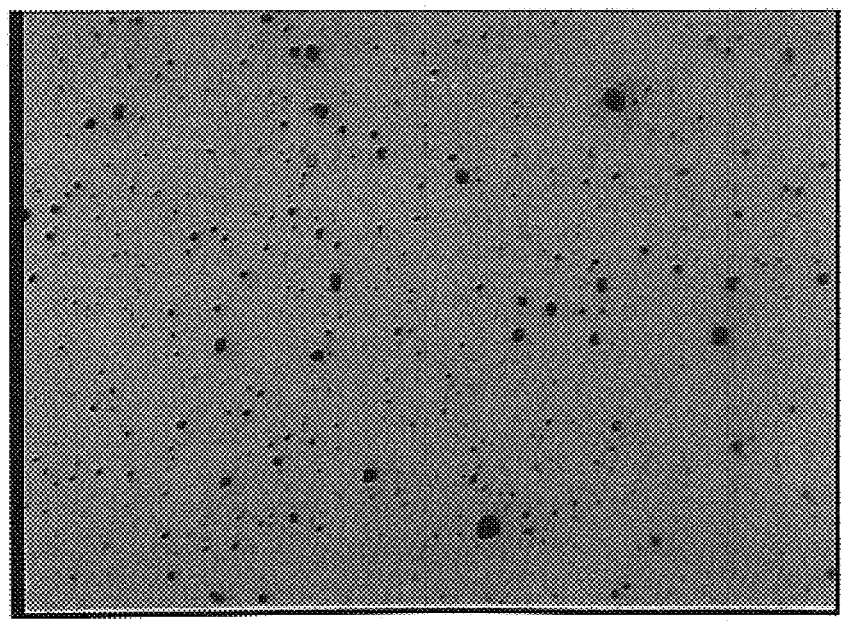
FIG. 5 is a photomicrograph showing the pigment after 15 minutes of dispersion.
Figure 6:
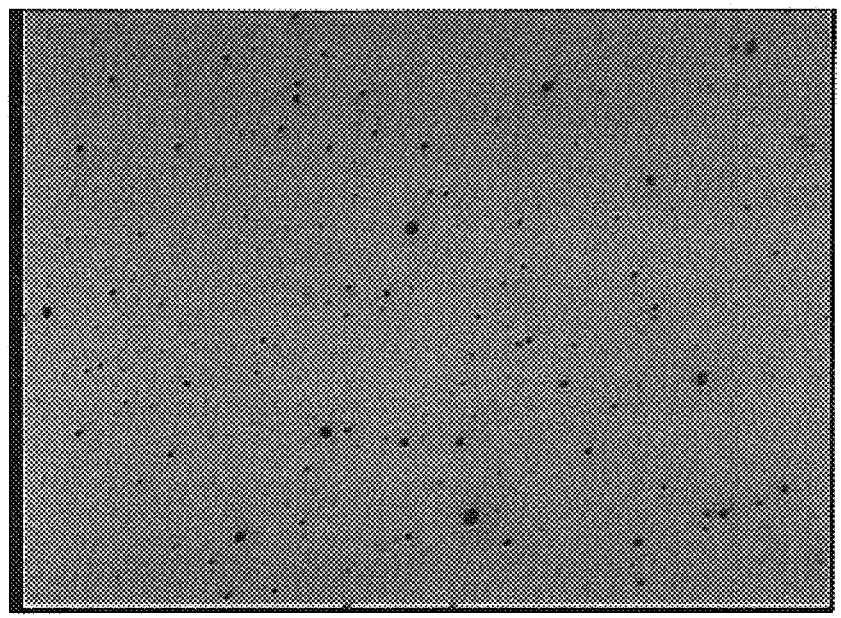
FIG. 6 is a photomicrograph showing the pigment after 30 minutes of dispersion.
Figure 7:
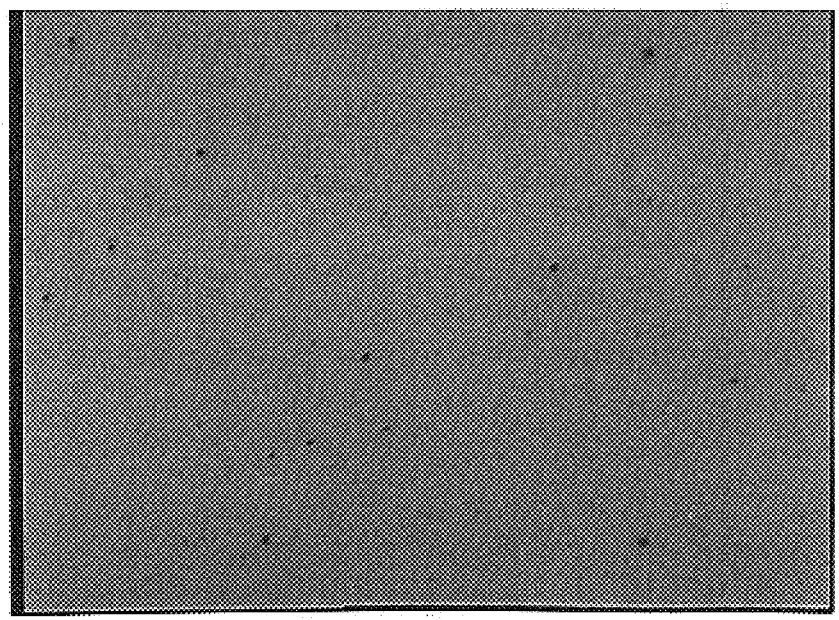
FIG. 7 is a photomicrograph showing the pigment after 45 minutes of dispersion.
Figure 8:
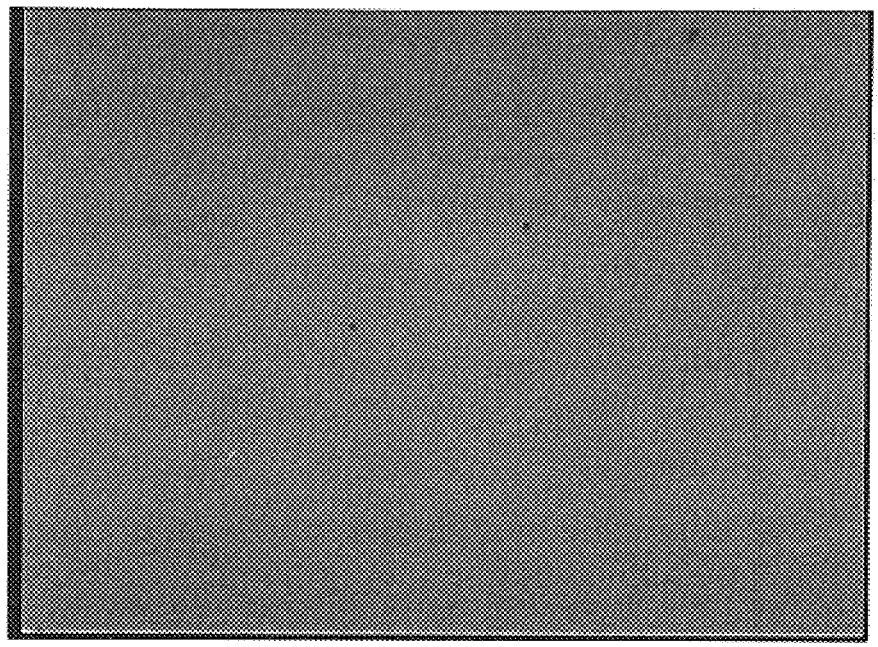
FIG. 8 is a photomicrograph showing the pigment after 60 minutes of dispersion.

FIGS. 1–3 show various embodiments of the subject invention. FIG. 1 shows the basic embodiment of this invention and is distinguished from the structures of FIGS. 2 and 3 due to the absence of metallic layers.

All three film structures 2, 4 and 6 of FIGS. 1–3 incorporate two polymeric films 8 and 10 in structure 2, 12 and 14 in structure 4, and 16 and 18 in structure 6. These pairs of film are the backbone of the film structures of this invention. Film layers 8 and 10 are bound to each other by adhesive layer 20, film layers 12 and 14 are bound to each other by adhesive layer 22 and lastly film layers 16 and 18 are bound to each other by adhesive layer 24.

Adhesive layers 20, 22 and 24 may incorporate the pigments which are used to color the film structures in accordance with this invention.

All three film structures 2, 4, and 6 incorporate pressure sensitive adhesive layers 26, 28 and 30. These pressure sensitive layers are used to bond the respective film structures to a substrate usually a glass glazing. In accordance with one embodiment of this invention the pigment may be incorporated into the pressure sensitive adhesive layer.

Further film structures 2, 4 and 6 incorporate silicone liners 32, 34 and 36. These silicone liners protect pressure sensitive layers 26, 28 and 30 prior to the application of films 2, 4 and 6 to an appropriate substrate. Silicone liners 32, 34 and 36 are peeled off prior to application.

Film structures 2, 4 and 6 also incorporate scratch resistant coatings 38, 40 and 42 which are harder than films 10, 14 and 18 and protect these film layers from abrasion during usage. These scratch resistant coatings protect the composite film structure from being scratched when the films are cleaned, i.e. the cleaning of the inside of an automotive window to which the film had been applied. In accordance with still another embodiment of this invention the pigment may be incorporated into the scratch resistant coating.

Further it is understood by one skilled in the art and as illustrated in FIGS. 2 and 3 that one or more surfaces of film layers 8 and 10, 12 and 14, and 16 and 18 may be metallized.

It is preferred that two inner surfaces of the film be metallized as is illustrated in FIG. 3.

Structure 4 as is illustrated in FIG. 2 incorporates a single metal layer 44. Preferred structure 6 as is shown in FIG. 3 incorporates a pair of metallic layers 46 and 48, which may be of the same or different metals. Metallic layers 44,46 and 48 are particularly useful in controlling the infrared absorption properties of the resulting film. These metal layers may be formed from metals such as aluminum, silver, gold, titanium, chromium, stainless steel etc. and alloys thereof.

As is discussed above it is preferred that coloration in accordance with this invention be effected by the addition of a pigment to an adhesive which is used to secure one or more layers of optical film together. In this connection referring to FIGS. 1–3 film layers 8, 10, 12, 14, 16 and 18 can be based on polyurethane, polyester, polyethylene, polypropylene, polycarbonate, ionomers etc. For most window film applications polyester based films are preferred.

The preferred films for use in accordance with this invention are polyester resin films as are sold by DuPont Teijin Company and other manufactures.

Regardless of the coloration effected by pigmentation UV degradation of the composite film structures 2, 4 and 6 is still a problem. In order to prevent this degradation the components of the film of this invention, can incorporate ultraviolet absorbers. These ultraviolet absorbers may be used at concentrations of from about 0 to 30%, a more preferred range is from 10 to 20%.

Regardless of the excellent light stability of pigmented window films, these films are troublesome in that they tend to have a haze levels which are higher than that of films wherein coloration is effected via dyed components.

Throughout this application all haze level evaluations were made in accordance with A.S.T.M. test No. D1003.

While pigmented film are typically at least seven times more light stable, as compared to dyed films, pigmented film have higher haze levels. In accordance with this invention pigmented window films having haze levels which approach the haze levels of dyed films are possible. The haze in pigmented window film results from the scattering of light off of pigment particles.

In order to prevent haze formation in the final pigmented window film, the pigments as used in the invention are coated with a resin binder. In preparation of the pigment for use in this invention care must be taken to completely encapsulate each pigment particle with resin binder. If each particle is not coated with resin binder agglomeration of the pigment particles will result. This agglomeration creates larger pigment particles, which cause an increase in the haze level of the completed window film.

The resin binder as is used to encapsulate the pigment particles must be compatible with the adhesive medium, in which the encapsulated pigment is blended. During the blending of the encapsulated pigment into the adhesive medium, the adhesive medium dissolves the resin binder in which the pigment is encapsulated.

In the blending of the encapsulated pigment into the adhesive medium, the blending process must be carried out in such a manner as to prevent the complete dissolution of the resin binder. That is throughout the film formation process the pigment particles must maintain at least minimal encapsulation by the resin binder. If the resin binder is completely dissolved by the adhesive medium the freed pigment particles will tend to agglomerate or form a gel with the adhesive, thereby creating larger pigment particles grouped with weak bonds in a gelation formation, which are more susceptible to light scattering and thereby increasing the haze level of the resulting window film.

The solution of the resin binder in the adhesive matrix must not be total otherwise agglomeration or gelation will result. In contrast, the solution of the resin binder in the adhesive matrix must be complete enough to allow the dispersion of the pigment in the adhesive matrix.

Theoretically in order to achieve these ends in accordance with the process of this invention, the solution level of the resin binder, which encapsulates the pigment, in the adhesive matrix should be almost complete. Referring to Table 1 below it can be seen that with a variety of pigments the haze level of a resulting film reaches a minimum level when the pigment dispersing time is at an intermediate level.

Table 1 shows the relationship between the haze level and dispersion time. Different pigments may have different dispersion patterns. Both over-dispersion and under-dispersion are not desirable. One has to experiment the dispersion time for a particular pigment. Over-dispersion could lead to a short pot life and under-dispersion could lead to a high haze level. There are many variables contributing to the dispersion time such as temperature, dispersion equipment and the speed.

TABLE 1

| Pigment Concentrate | Time of dispersion | VLT (%) | Haze (%) |
| --- | --- | --- | --- |
| Carbon Black | 30 min | 25.1 | 5.45 |
| pigment concentrate | 60 min | 25.7 | 5.05 |
|  | 90 min | 23.4 | 5.32 |
| Indanthrone Blue | 30 min | 47.9 | 1.66 |
| pigment concentrate | 60 min | 50.1 | 1.08 |
|  | 90 min | 49.0 | 1.12 |
| Isoindolinone Yellow | 30 min | 85.1 | 3.99 |
| pigment concentrate | 60 min | 87.1 | 3.94 |
|  | 90 min | 87.1 | 3.98 |
| Cu-phthalocyanine | 30 min | 70.8 | 0.28 |
| (halogenate) Green | 60 min | 72.4 | 0.24 |
| pigment concentrate | 90 min | 72.4 | 0.40 |
| Diketo-pyrrolo-pyrrole | 30 min | 47.9 | 4.85 |
| Red pigment concentrate | 60 min | 49.0 | 3.84 |
|  | 90 min | 50.1 | 3.24 |
|  | 120 min | 47.9 | 3.60 |
| Azo condensation | 30 min | 72.4 | 21.40 |
| Brown pigment | 60 min | 72.4 | 21.14 |
| concentrate | 90 min | 70.8 | 23.36 |

In order to determine the optimal dispersion time with the process of this invention, the dispersion time was extended to 3 hours to see if there was an improvement in the haze level. However, with this experiment there was no improvement in the haze level, but there were some side effects such as rheology changes, fluffiness, gelation, and instability, which caused a short pot life.

During the test of tables I, the haze level gradually improved during the first 50–60 minutes of dispersion; this improvement can be seen from the photomicrographs as are illustrated in FIGS. 4–8. It is believed that pigment agglomerates were reduced during this time. With prolonged dispersion time, no further improvement was captured by the microscope. One can correlate the particle size reduction and haze level improvement; which would show a steep gradual slope from the beginning through the optimal dispersion time of 50–60 minutes, with no significant improvement after that. The negative affects, such as rheology, gelation and separation, occurred later in the time frame. These negative effects are thought to be attributed to over-dissolving the encapsulating binder, which surrounds the pigment particles and protects these particles from agglomeration. The bare pigment particles will have very high surface energy and further they might function as crosslinkers to cause gelation. Since the particle size is so small, it is very hard to provide physical evidence of what was really happening, besides the empirical results, as are shown in FIGS. 4–8.

More evidence, supporting the optimal time for dispersion of the pigments is the transition from matte to gloss finish of the pigment concentrate on their draw-down films. At the beginning of the dispersion, the draw-down is coarse, rough and irregular. Pigment particles are visible to the naked eye, and the film when dried is fuzzy and has highly matte finish. This matte finish persisted throughout the first 45 minutes of the dispersion process. As the dispersion progressed, the draw-down became smoother and less light diffusing, which produced brighter film finishes. The biggest transition occurred at about 50 minutes, when the draw-down film turned very bright, shiny and highly glossy. At this point when the particles were dispersed and the agglomerates were broken into the smallest single particles which were dispersed. The photomicrographs of FIGS. 4–8 showed a clear and clean view of the film surface. Further dispersion, up to 65 minutes, could improve this photo image only slightly. Any time after that did not make any improvement.

While the above discussion relates to the use of single pigment, it is understood by one skilled in the art that mixtures of pigments may be utilized to achieve different colors and shades.

The present invention is further illustrated by the following Examples however, these examples are not to be construed as limiting the invention.

EXAMPLES

In the below listed examples various colored pigmented films were prepared and tested. In these examples two layers of Mylar Polyester film having a thickness of 1 mil, as sold by DuPont Teijin Film Company were bonded together with various formulations of pigmented adhesives. The adhesives utilized were polyester based adhesives having a solid content of 40 percent.

All percentages and parts listed are in weight. When the percentage relates to a pigment, said percentage is based on the weight of the encapsulated pigment. That is the weight of the pigment with the resin binder coating.

Various colored adhesive formulations were made by using pigment concentrates to tint the clear adhesive to achieve the desired color and VLT. The process used to prepare these adhesive compositions is as follows.

The pigments used were ultra fine pigments encapsulated with an organic resin binder. The particles size distributions were as narrow as possible. The particle size distribution for the pigments used in the Examples is in accordance with Table 2.

TABLE 2

| Pigment | D max (μm) | D 16 (μm) | D 50 (μm) | D 84 (μm) |
|---|---|---|---|---|
| Carbon Black pigment | 0.078 | 0.053 | 0.077 | 0.103 |
| Isoindolinone Yellow pigment | 0.080 | 0.069 | 0.088 | 0.114 |
| Indanthrone Blue pigment | 0.039 | 0.030 | 0.042 | 0.058 |
| Diketo-pyrrolo-pyrrole Red pigment | 0.049 | 0.041 | 0.050 | 0.060 |
| Cu-phthalocyanine (halogenate) Green pigment | 0.030 | 0.024 | 0.041 | 0.067 |

TABLE 2-continued

| Pigment | D max (μm) | D 16 (μm) | D 50 (μm) | D 84 (μm) |
|---|---|---|---|---|
| Azo condensation Brown pigment | 0.071 | 0.054 | 0.080 | 0.112 |
| Diarylide Yellow pigment | 0.061 | 0.044 | 0.059 | 0.08 |
| Azo condensation Red pigment | 0.113 | 0.089 | 0.116 | 0.144 |

Where,
Dmax maximum of distribution curve
D16 16% by weight particles are finer than this value
D50 50% by weight particles are finer than this value
D84 84% by weight particles are finer than this value For use in preparing the samples, a mixed solvent of toluene and methyl ethyl ketone with a ratio of 1:3 was prepared, this solvent was used to adjust the viscosity of the pigment concentrate during the dispersion process.

Pigment concentrates for use in the examples were prepared by mixing 72.5 parts of clear vehicle with high-shear dispersion equipment sold by BYK Gardner at room temperature at mixing speed of about 500 rpm, to this vehicle was added 12.5 parts of polyester resin adhesive with a 40% solids content and the mixing continued for another 10 minutes. Then, 15.0 parts of ultra fine pigment powder was then added and the speed was increased to 1000 rpm until the doughnut-like flow pattern was formed around the shaft. The overall dispersion process took about 50 minutes. The process time was decided by haze measurement at equal intervals during the dispersion process until minimal haze levels were achieved: In order to make the haze level evaluation, a layer of pigment concentrate adhesive was coated on a 1 mil PET film with a number 12 Mayer rod, which is equivalent to a coating weight of 2.77 gr/m$^2$, and laminated to another 1 mil PET film with a heated laminator at 175 F. The haze of the coated film was measured by CS-5 Chroma Sensor Spectrophotometer, made by Datacolor International, Inc., following ASTM standard D1003 method. The lowest haze measured for the particular pigment concentrate and the appropriate dispersion time were recorded and assigned as presetting parameters for the particular pigment concentrate preparation. The optimal dispersion time for various pigments may be different due to their various particle size distributions. Over-dispersion or under-dispersion causes higher haze levels as a result of agglomeration or gelation. These tests were repeated until minimal haze levels were achieved. The photomicrographs of FIGS. 4–8 were taken with an optical microscope at equal time intervals are shown in FIGS. 4–8. These photomicrographs demonstrate the haze improvement by the particle size reduction i.e. agglomerates decomposition.

The pigments used for the below listed Examples were Microlith Black C-K, Microlith Yellow 3R-K, Microlith Blue A3R-K, and Microlith DPP Red B-K pigment based mother concentrates.

Using the color concentrates prepared above, color film samples were then prepared. In a suitable container, 34.0 parts of methyl ethyl ketone were mixed with 19.0 parts of toluene at room temperature, 47.0 parts of polyester adhesive resin, with 40% solids content, was slowly added in and mixed for an additional 10 minutes. With additional mixing, 10.0 parts of the prepared pigment concentrate was slowly added to the adhesive resin solution and mixed for additional 15 minutes. The sample was coated on a 1 mil clear PET film with a number 12 Mayer rod, which is equivalent to a coating weight of 2.77 gr/m2, and laminated to another 1 mil clear PET film with a heated laminator at 175° F. The haze was measured by CS-5 chroma Sensor Spectrophotometer, made by Datacolor International, Inc., following ASTM standard D1003 method. Haze levels of 3% or less was considered pass.

The data for Examples 1 to 24 is specified in Table 3.

TABLE 3

| Examples | Product name | VLT (%) Before weathering | VLT (%) After weathering 1000 hrs QUV | Haze (%) | Pigment particle size D 84 (μm) | Dry pigment based on dry resin solids (%) |
|---|---|---|---|---|---|---|
| Example 1 | Al metallized film | 55.0 | | 1.31 | N/A | N/A |
| Example 2 | Al metallized film | 65.0 | | 0.99 | N/A | N/A |
| Example 3 | Azo (chromium complex) Solvent Black dye | 19.1 | 97.7 | 0.76 | N/A | 1.23 |
| Example 4 | Carbon Black pigment | 20.0 | 20.4 | 4.50 | 0.103 | 1.13 |
| Example 5 | Anthraquinone Solvent Blue dye | 50.1 | 95.5 | 0.68 | N/A | 0.93 |
| Example 6 | Indanthrone Blue pigment | 50.1 | 55.0 | 1.04 | 0.058 | 1.06 |
| Example 7 | Carbon Black pigment | 55.0 | | 3.00 | 0.103 | 2.78 |
| Example 8 | | 64.6 | | 2.81 | 0.103 | 2.22 |
| Example 9 | | 69.2 | | 2.38 | 0.103 | 1.67 |
| Example 10 | Indanthrone Blue pigment | 35.0 | | 1.61 | 0.058 | 14.72 |
| Example 11 | | 45.7 | | 1.41 | 0.058 | 10.44 |
| Example 12 | | 49.0 | | 1.09 | 0.058 | 9.25 |
| Example 13 | | 56.2 | | 1.06 | 0.058 | 6.89 |
| Example 14 | Cu-phthalocyanine (halogenate) Green pigment | 56.2 | | 0.29 | | 22.83 |
| Example 15 | | 64.6 | | 0.23 | | 16.67 |
| Example 16 | | 72.4 | | 0.20 | | 8.33 |
| Example 17 | Diketo-pyrrolo-pyrrole Red pigment | 49.0 | | 3.00 | 0.060 | 8.33 |
| Example 18 | | 51.3 | | 2.57 | 0.060 | 6.67 |
| Example 19 | | 64.6 | | 1.90 | 0.060 | 4.00 |
| Example 20 | | 67.6 | | 1.88 | 0.060 | 3.15 |
| Example 21 | | 70.8 | | 1.72 | 0.060 | 2.50 |
| Example 22 | Isoindolinone Yellow pigment | 89.1 | | 3.00 | 0.114 | 4.17 |
| Example 23 | Azo condensation Red pigment | 66.0 | | 11.11 | 0.144 | 8.33 |
| Example 24 | Azo condensation Brown pigment | 70.8 | | 23.36 | | 8.33 |

In the testing samples for weatherability the film samples of Examples 3–6 were further coated with a clear pressure sensitive adhesive and the film was mounted on a glass panel. The control samples, Examples 3 & 5, were made in the same manner as the pigmented film for Examples 4 & 6, but using dyes instead of pigments as coloring agents. The sample and the control have the same VLT and color.

The weatherability test was conducted in QUV Accelerated Weathering Tester manufactured by the Q-Panel Company. The film was mounted on a glass panel with dimensions of 7.62 cm×30.48 cm×0.635 cm. The glass side was facing the UV light source. The testing is conducted following the ASTM standard G154 method for 1000 hours Comparing the above listed examples it can be seen that the films of Examples 1 and 2 were standard commercially available metallized films, which were sputter coated with the metal layers. The VLT's are 55% and 65%. The base films were 1 mil PET, which has a typical haze level of 0.2%. The sputtered films have overall haze level of 1.31% and 0.99% respectively.

In the testing samples for weatherability, the film samples of Examples 3–6 were further coated with clear pressure sensitive adhesive layer and the film were mounted on a glass panel in accordance with the above description. The control samples of Examples 3 and 5 were made in the same way but using dyes instead of pigments. The samples and controls were made of almost the same VLT and color. Both samples and controls did not incorporate UV screeners or stabilizers.

Comparing the results of samples and controls, it can be seen that pigments had very little or almost no color changes but the controls, which used dyes as coloring agents, became almost totally clear during the weatherability testing. Even though the dye controls had much lower haze levels, the fading which occurred during the weatherability test is a severe detriment.

Examples 7–24 are films which incorporate pigments of different particle sizes. It can be seen that the particle size is very important in the control of the haze level. Examples 10–21 demonstrate that pigments having a D84 of 0.06 μm, can allow very high pigment load and yet the film still has an acceptable haze level. When the particle size is about 0.10 μm, as in Examples 7–9, it still can be used but with a lower pigment load. Once the particle size is above 0.11 μm, the use of pigments as coloring agents in film structures is questionable. However, these large particle size pigments still can be used for window film application but with a very low pigment loading. One can also see the different colors have different color strength, which means that for some colors such as yellow and green much more pigments must be used in order to achieve the same VLT as compared to other pigments i.e. a black or a blue pigment.

While the above description primarily discusses how the pigment can be formulated into an adhesive matrix, the pigment could likewise be incorporated into the polymeric film matrix.

Although preferred embodiments have been described herein above, variations may be made thereto in view of the above teachings. It is therefore understood by one skilled in the art that within the scope of the appended claims the subject invention may be produced otherwise than as specifically described herein above.

What is claimed is:

1. A composite colored multi layer window film structure comprising:

(a) at least two clear films which are secured to each other via an adhesive layer; and (b) wherein at least one layer incorporates encapsulated pigment particles wherein an average particle size of the pigment particles is about 0.06 microns and wherein the pigment is an organic pigment and the pigment particles are encapsulated in a resin binder wherein the resin binder is a copolymer of vinyl chloride and vinyl acetate and the ratio of vinyl chloride to vinyl acetate is from about 85/15 to about 90/10, the weight average molecular weight of the copolymer is between 30,000 and 85,000.

2. The composite colored window film structure of claim 1 wherein the pigment is incorporated into an adhesive layer, which is used to secure the clear films together.

3. The composite colored window film structure of claim 1 wherein the pigment is incorporated in a pressure sensitive coating, which is integral with an outer surface of the film structure.

4. The composite colored window film structure of claim 1 wherein the pigment is incorporated in a scratch resistant coating, which is integral with an outer surface of the film structure.

5. The composite colored window film structure of claim 1 wherein the pigment is incorporated in one or more of the clear film layers.

6. A composite colored multi layer window film structure comprising:

(a) at least two clear films which are secured to each other via an adhesive layer; and (b) wherein at least one layer incorporates encapsulated pigment particles where a diameter of the pigment particles is from about 0.003 to 0.2 microns and wherein the pigment is an organic pigment and the pigment particles are encapsulated in a resin binder wherein the resin binder is vinyl butyral polymer having a weight average molecular weight of from about 10,000 to about 100,000.

7. The composite structure of claim 6 wherein the weight average molecular of the resin binder is from about 30,000 to about 80,000.

8. The composite structure of claim 6 wherein the weight average molecular weight of the resin binder is from about 55,000 to about 65,000 and the particle size of the pigment is about 0.06 microns.

9. The composite colored window film structure of claim 6 wherein the pigment is incorporated in an adhesive layer, which is used to secure the clear films together.

10. The composite structure of claim 9 wherein the weight average molecular weight of the resin binder is from about 30,000 to about 80,000 and the particle size of the pigment is about 0.06 microns.

* * * * *